United States Patent [19]

Steiner

[11] Patent Number: 4,673,042

[45] Date of Patent: Jun. 16, 1987

[54] PNEUMATIC HAMMER

[75] Inventor: Heinz Steiner, Dörflingen, Switzerland

[73] Assignee: SIG Schweizerische Industrie-Gesellschaft, Neuhausen am Rheinfall, Switzerland

[21] Appl. No.: 739,090

[22] Filed: May 29, 1985

[30] Foreign Application Priority Data

May 29, 1984 [CH] Switzerland .......................... 2639/84

[51] Int. Cl.⁴ .............................................. B23B 45/16

[52] U.S. Cl. .................................... 173/134; 173/116; 173/DIG. 2

[58] Field of Search ........... 173/134, 135, 139, 162 R, 173/162 H, 168, 169, DIG. 2, 116

[56] References Cited

U.S. PATENT DOCUMENTS

| | | | |
|---|---|---|---|
| 2,128,742 | 8/1938 | Fuehrer | 173/DIG. 2 |
| 2,166,218 | 7/1939 | Morrison . | |
| 3,223,181 | 12/1965 | Price . | |
| 3,255,844 | 6/1966 | Wallace | 173/DIG. 2 |
| 3,263,770 | 8/1966 | Alm | 173/134 X |
| 3,880,245 | 4/1975 | Anderson | 173/163 |
| 4,018,291 | 4/1977 | Anderson | 173/139 X |
| 4,303,131 | 12/1981 | Clark | 173/134 |
| 4,303,133 | 12/1981 | Godolphin | 173/134 |

FOREIGN PATENT DOCUMENTS

| | | |
|---|---|---|
| 15700 | 7/1982 | European Pat. Off. . |
| 2385496 | 10/1978 | France . |
| 2388646 | 11/1978 | France . |

*Primary Examiner*—E. R. Kazenske
*Assistant Examiner*—Willmon Fridie, Jr.
*Attorney, Agent, or Firm*—Spencer & Frank

[57] ABSTRACT

A pneumatic hammer includes a cylinder tube, a piston received in the cylinder tube for reciprocation therein; a device for alternatingly introducing pressurized air into first and second cylinder chambers on either side of the piston for driving the piston back and forth and an exhaust arrangement for removing spent air from the cylinder into the ambient atmosphere. There is provided a coupling cylinder mounted within the hammer housing and generally coaxially surrounding the cylinder tube along a substantial length thereof. The support cylinder has a plurality of circumferentially distributed longitudinal ribs extending parallel to the cylinder tube. The longitudinal ribs are in contact with an inner surface of the housing and an outer surface of the cylinder tube. The longitudinal ribs define and bound a first longitudinal chamber which is in communication an air outlet port provided in the cylinder tube and a second longitudinal chamber communicating in series with the first longitudinal chamber and further communicating with an exhaust outlet provided in the housing.

11 Claims, 5 Drawing Figures

PNEUMATIC HAMMER

BACKGROUND OF THE INVENTION

This invention relates to a pneumatic hammer which has a piston reciprocating in a metal cylinder tube, dividing the latter into an upper and a lower cylinder chamber, a plastic housing which serves as an external casing and which has at least one exhaust outlet, a support block mounted in the housing and holding an upper end of the cylinder tube and an oscillating valve housed in the support block and supplied with pressurized air from the outside. The oscillating valve alternatively introduces pressurized air into the upper and lower cylinder chambers to impart a reciprocating motion to a piston accommodated in the cylinder tube. Motions of the piston in the one direction serve to supply a driving force, for example, by delivering blows to an anvil or an end face of a tool shaft. The pressurized fluid is guided to the lower cylinder chamber in a conventional manner by longitudinally extending flow channels provided in the cylinder wall. Since the cylinder is made of a hardenable steel by casting or forging and the cylinder bore as well as the channels are made by subsequent machining, the result has been a tool of substantial weight and significant expense.

U.S. Pat. No. 3,263,770 proposes to coat the metal cylinder which accommodates the working piston, with a thin layer of damping material, for example, of rubber or an elastomer along its entire length, and to surround closely the layer with a thin steel jacket. An exhaust muffler is provided for noise suppression.

U.S. Pat. No. 2,128,742 describes a tool wherein an outer body of insulating material is formed on the metal cylinder. An envelope constituted by a tube surrounds the mid portion of the cylinder and forms, together with the cylinder, an expansion chamber for receiving the fluid from the outlet opening of the cylinder. Annular plates are provided at the ends of the expansion chamber. A plurality of axial separating walls are arranged in a stepwise manner about the cylinder. One of the two separating walls is, on either side of the outlet opening, at a distance from the lower annular plate while the other separating wall is at a distance from the upper annular plate. Two further separating walls are arranged in a similarly offset manner and thus the outgoing fluid has to travel along two long paths to the exhaust in the envelope. This arrangement is intended to produce a damping effect.

European Pat. No. 15,700, to which correspond U.S. Pat. Nos. 4,303,131 and 4,303,133 describes a pneumatic hammer in which a cylinder tube accommodates a reciprocating piston and is surrounded by a rubber supporting body. In radial longitudinal ribs there are provided flow channels for supplying the fluid to the lower cylinder chamber. The upper cylinder chamber is directly supplied with pressurized air from an oscillating valve. A cylindrical noise suppressing (muffling) tube surrounds the cylinder along its entire length including the anvil and the tool holder. Between the noise suppressing tube and the rubber supporting body there is formed a noise suppressing chamber which is in communication with the environment by means of openings. According to a variant three ribs are provided, each being in contact with the noise suppressing tube and thus bound axially extending chambers. From the cylinder chamber there extend two gas outlets to two different chambers. These chambers are connected at the side oriented towards the tool bit with a further, third chamber with the intermediary of throttles. The third chamber is bounded by the ribs and is in communication with the external environment by means of an inner elongated port. In this manner, two damping chambers are connected in series. The noise suppressing chamber too, is of rubber so that all components forming chambers and flow channels are made of a formable material which reduces the overall weight of the tool, and further, the manufacturing costs may be maintained at a low level despite the use of an intricate noise suppressing arrangement.

SUMMARY OF THE INVENTION

It is an object of the invention to provide a percussion tool in which the noise level is further reduced and the compressed air is expanded to such an extent that it leaves the exhaust opening as evenly as possible and further, the risks of icing are reduced to the greatest possible extent and also, by virtue of an appropriate shaping of the plastic components a simple and inexpensive solution is obtained.

This object and others to become apparent as the specification progresses, are accomplished by the invention, according to which, briefly stated, the pneumatic hammer includes a cylinder tube, a piston received in the cylinder tube for reciprocation therein; a device for alternatingly introducing pressurized air into first and second cylinder chambers on either side of the piston for driving the piston back and forth and an exhaust arrangement for removing spent air from the cylinder into the ambient atmosphere. There is provided a coupling cylinder mounted within the hammer housing and generally coaxially surrounding the cylinder tube along a substantial length thereof. The support cylinder has a plurality of circumferentially distributed longitudinal ribs extending parallel to the cylinder tube. The longitudinal ribs are in contact with an inner surface of the housing and an outer surface of the cylinder tube. The longitudinal ribs define and bound a first longitudinal chamber which is in communication with an air outlet port provided in the cylinder tube and a second longitudinal chamber communicating in series with the first longitudinal chamber and further communicating with an exhaust outlet provided in the housings.

DESCRIPTION OF THE PREFERRED EMBODIMENT

Figure 1:
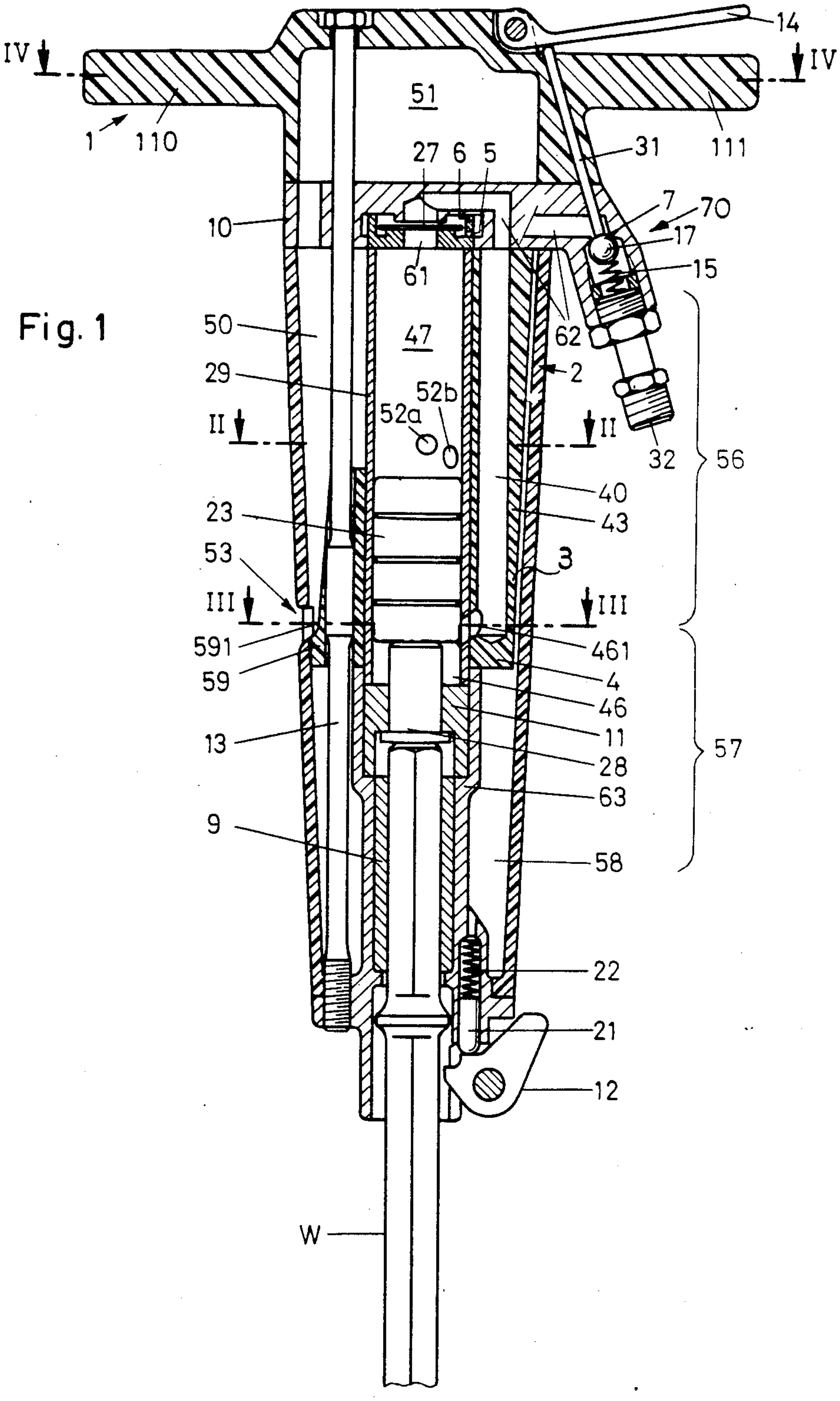
FIG. 1 is an axial sectional view of a preferred embodiment of the invention.
Figure 2:
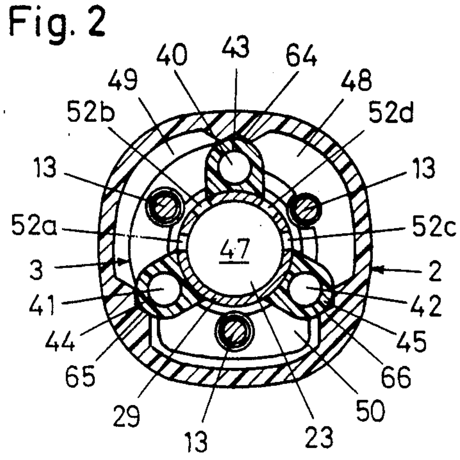
FIG. 2 is a sectional view taken along line II—II of FIG. 1.

Turning now to FIGS. 1 and 2, the pneumatic (percussion) hammer shown therein comprises a handle portion 1 having hand grips 110 and 111. The hand grip 111 is provided with a trigger lever 14 which conventionally operates a control valve generally indicated at 70. The control lever 70 has an actuating pin 31 cooperating with the trigger lever 14, and a valve ball 17 normally pressed into its seat 7 by a valve spring 15. Upon pushing down the trigger lever 14 the actuating pin 31 unseats the valve ball 17 against the force of the valve spring 15 to allow pressurized air to enter from an external source through the air coupling 32 into a cylinder 29. Thus, from the control valve 70 pressurized air flows through ports 62 provided in a cylinder head 10 of the cylinder 29 and, by means of two radial ports 5 and 6 the pressurized air flows to opposite sides of a pressure responsive distributor valve 27. Dependent upon the momentary position of the valve plate 27a of the valve 27, at a first moment air passes through a central opening 61 in the cylinder head 10 into an upper cylinder chamber 47 and at a second moment air flows through the ports 62 and flow channels 40, 41 and 42 and is introduced into a lower cylinder chamber 46. Thus, the valve 27 alternatingly directs air into the lower and upper cylinder chambers 46 and 47.

The cylinder 29 is formed of a metal tube having a polished inner cylinder face and a smooth outer face. Within the cylinder 29 there is accommodated a percussion piston 23 which divides the inner space of the cylinder 29 into the lower and upper cylinder chambers 46 and 47. The cylinder 29 is provided with four radial ports 52a, 52b, 52c and 52d which serve as air outlet openings and which are situated approximately in the mid region of the cylinder 29. That end of the cylinder 29 which is oriented towards a tool bit W is closed by an anvil guiding sleeve 11 which has an axial opening for receiving therein an axially displaceable anvil 28. The lower edge portion of the cylinder 29 is embraced by a cylindrical support 63 which also serves for positioning the anvil guiding sleeve 11. Further, the support 63 also embraces and holds a wear sleeve 9 in which the terminal shaft of the tool bit W is axially slidably arranged. The sleeve 63 further supports a pivotal tool bit lock 12 which is maintained in its operative, locking position by a pin 21 biased by a spring 22. The housing 2 is held fixedly relative to the cylinder 29 by means of three ribs 43, 44 and 45 which project radially relative to the longitudinal axis of the cylinder 29 and which constitute one-piece components of a coupling cylinder 3 surrounding the cylinder tube 29 at least partially at its lower end. Counter ribs 64, 65 and 66 formed in the inner wall of the housing 2 have longitudinal grooves to receive crest portions of the respective ribs 43, 44 and 45 to thus assist in holding the housing 2 firmly and immovably relative to the cylinder tube 29. By means of this arrangement, the ribs 43, 44 and 45 need not be secured to the cylinder tube 29 or the latter need not be entirely covered by a jacket. The ribs 43, 44 and 45 contain the respective flow channels 40, 41 and 42, two of which (the flow channels 40 and 41) are coupled with the lower cylinder chamber 46 by means of ports 461 and 462 as shown in FIG. 3.

Figure 3:
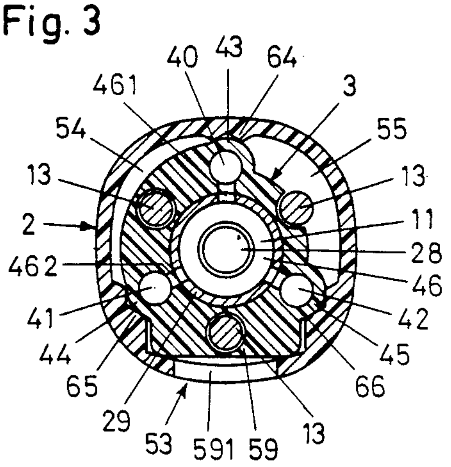
FIG. 3 is a sectional view taken along line III—III of FIG. 1.

As seen in FIGS. 2 and 3, between the ribs 43, 44 and 45 three longitudinal chambers 48, 49 and 50 are formed. Two chambers 48 and 49 are connected by means of the pairwise arranged gas outlet openings 52a–52d with the cylinder chambers 46 and 47 while the chamber 50 communicates with the external environment by means of an exhaust opening 53.

In the zone of the coupling cylinder 3 two ports 54, 55 are formed which open into a resonance chamber 58 by means of recesses in the coupling cylinder 3. The latter has, in the zone of the exhaust 53, an air guide element 59 which constitutes a nozzle 591 which may be formed integrally with the housing 2, or the housing 2 and the coupling cylinder 3 together may form a nozzle opening.

Figure 4:
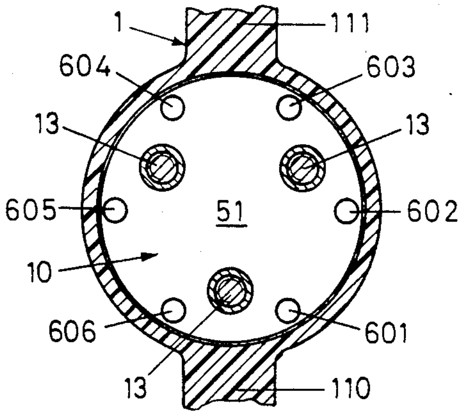
FIG. 4 is a sectional view taken along line IV—IV of FIG. 1.

Referring now to FIGS. 1, 2 and 4, the cylinder head 10 forms the bottom of a transfer chamber 51 formed in the handle portion 1. The two chambers 48 and 49 supplied with exhaust gases from the cylinder chambers 46 and 47 each have two passages 602, 603, 604 and 605 and also, the gases may be admitted to the chamber 50 through two further passages 601 and 606.

The plastic components such as the housing 2, the coupling cylinder 3 together with the ribs 43, 44 and 45 and a guide flange 4 are tightened to one another by three tensioning bolts 13 passing through the handle portion 1 and the cylindrical support 63.

Figure 5:
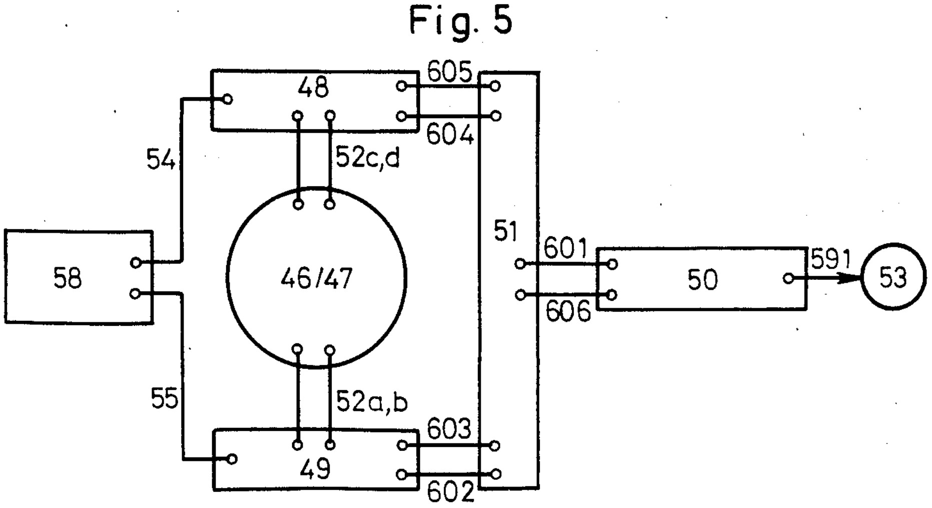
FIG. 5 is a block diagram illustrating the interconnection of components of the preferred embodiment.

Turning now to FIG. 5, for silencing exhaust noises the exhaust gases flow from the cylinder chambers 46 and 47 through the two pairwise arranged outlet openings 52a, 52b and 52c, 52d into respective elongated expansion chambers 48, 49 which are in communication with a resonance chamber 58 by means of respective ports 54 and 55 at one end. At the other end the passages 602–605 constitute a connection to the transfer chamber 51 from which the gases are fed through the exhaust chamber 50 to the exhaust 53. The pairwise arranged passages 52a–52d are offset, whereby the outlet cross section for the exhaust gas widens gradually as the piston 23 reaches the reversal points from either side. This has, as known by itself, a favorable noise suppressing effect. By virtue of this arrangement the gas enters simultaneously into the two expansion chambers 48, 49 which have a cavity resonating with the generated noise. The length of the expansion chambers is determined by the cylinder head 10 on one side and by the coupling cylinder 3 on the other side. The unequal sizes of the passages 54, 55 formed between the coupling cylinder 3 and the housing 2 by means of flange-like enlargements of the coupling cylinder 3 result in a different insulation for the resonance chamber 58 and, as a result, sonic pressures at those locations are dampened to a different extent so that non-uniform frequency ranges may be absorbed by the resonance chamber 58—which functions as a Helmholtz resonator—whereby a wide-band noise suppression is achieved.

It will be understood that the above description of the present invention is susceptible to various modifications, changes and adaptations, and the same are intended to be comprehended within the meaning and range of equivalents of the appended claims.

What is claimed is:

1. In a pneumatic hammer including a housing; a cylinder tube accommodated in the housing and having upper and lower length portions terminating in respective upper and lower ends; a cylinder head mounted in the housing and connected to said upper end of said cylinder tube for supporting said cylinder tube; an impacting piston received in an inner space of said cylinder tube for reciprocating motion therein; said piston dividing said inner space into an upper and a lower cylinder chamber; a pressure responsive distributor valve mounted in said cylinder head; pressurized air supply means for introducing externally pressurized air to said valve; first and second channel means extending within said housing and being connected to said valve and to said upper and, respectively, said lower cylinder chambers for alternatingly introducing pressurized air from said valve into said upper and lower cylinder chambers for driving said impacting piston back and forth; exhaust means for removing spent air from said upper and lower cylinder chambers to the ambient atmosphere externally of said pneumatic hammer; and a tool bit extending into said housing and being periodically impacted at least indirectly by said impacting piston; said exhaust means including first aperture means provided in said cylinder tube approximately at a mid portion thereof and second aperture means provided in said housing and communicating with said first aperture means; the improvement comprising a coupling cylinder mounted within said housing and at least partially surrounding said cylinder tube solely at said lower length portion thereof; a plurality of longitudinal ribs having lower ends integrally connected with said coupling cylinder and being free from connection to one another above the lower ends thereof; said longitudinal ribs extending parallel to said cylinder tube externally thereof and each having an upper end terminating at said cylinder head; said longitudinal ribs being circumferentially distributed about said cylinder tube and being in a longitudinal engagement with an inner surface of said housing and an outer surface of said cylinder tube for centering said cylinder tube relative to said housing; said longitudinal ribs defining and bounding first longitudinal chamber means being in communication with said first aperture means and second longitudinal chamber means communicating in series with said first longitudinal chamber means and further communicating with said second aperture means; said first and second longitudinal chamber means forming part of said exhaust means; a transfer chamber formed in said housing and being separated from said first and second longitudinal chamber means by said cylinder head; and means for maintaining communication between said first longitudinal chamber means and said transfer chamber and between said second longitudinal chamber means and said transfer chamber.

2. A pneumatic hammer as defined in claim 1, wherein said coupling cylinder has an end remote from said cylinder head; said end of said coupling cylinder bounding an upper end of a lower inner space of said housing; said lower inner space forming a resonance chamber; further comprising means defining passages maintaining communication between said first longitudinal chamber means and said resonance chamber.

3. A pneumatic hammer as defined in claim 1, wherein said first and second channel means are provided within said longitudinal ribs.

4. A pneumatic hammer as defined in claim 1, wherein said coupling cylinder has a surface portion adjacent said second aperture means; said surface portion being arranged for guiding the spent gases towards said second aperture means.

5. A pneumatic hammer as defined in claim 4, wherein said surface portion of said coupling cylinder and an adjoining inner wall portion of said housing together form a nozzle for advancing the spent gases towards said second aperture means.

6. A pneumatic hammer as defined in claim 1, wherein said means for maintaining communication between said first longitudinal chamber means and said transfer chamber, and said means for maintaining communication between said transfer chamber and said second longitudinal chamber means includes a throttled cross-sectional passage.

7. A pneumatic hammer as defined in claim 6, wherein the throttled cross-sectional passages are formed by openings in said cylinder head.

8. A pneumatic hammer as defined in claim 1, wherein said first longitudinal chamber means comprises first and second longitudinal side chambers extending side-by-side in a parallel relationship to one another; said first aperture means comprising a first pair of openings communicating with said first longitudinal side chambers and a second pair of openings communicating with said second longitudinal side chamber for causing flow of exhaust gases from said cylinder tube simultaneously in said first and second longitudinal side chambers.

9. In a pneumatic motor having a cylinder, a piston received in the cylinder for reciprocation therein; said piston dividing the cylinder into first and second cylinder chambers; means for alternatingly introducing pressurized air into said first and second cylinder chambers for driving the piston back and forth in said cylinder and exhaust means for removing spent air from said cylinder into the ambient atmosphere; said exhaust means including an outlet port provided in said cylinder and an exhaust outlet communicating with the ambient atmosphere; the improvement wherein said exhaust means includes a muffling system, comprising (a) a first expansion chamber;
(b) first passage means for maintaining communication between said outlet port and said expansion chamber;
(c) a resonance chamber;
(d) second passage means for maintaining communication between said expansion chamber and said resonance chamber;
(e) third, throttled passage means for maintaining communication between said expansion chamber and said exhaust outlet;
(f) a second expansion chamber;
(g) fourth passage means maintaining communication between said outlet port and said second expansion chamber;
(h) fifth passage means maintaining communication between said second expansion chamber and said resonance chamber;
(i) a transfer chamber; and
(j) first, second and third throttled passages forming part of said third, throttled passage means; said first throttled passage maintaining communication between said first expansion chamber and said transfer chamber; said second throttled passage maintaining communication between said second expansion chamber and said transfer chamber and said third throttled passage maintaining an at least indirect communication between said transfer chamber and said exhaust outlet.

10. A pneumatic motor as defined in claim 9, wherein said third, throttled passage means is formed of a fourth and a fifth throttled passage; further comprising a side chamber; said fourth throttled passage maintaining communication between said transfer chamber and said side chamber and said fifth throttled passage maintaining communication between said side chamber and said exhaust outlet.

11. A pneumatic motor as defined in claim 10, wherein the first and second expansion chambers have an elongated configuration and opposite ends, and said first and fourth passage means open into the first and second expansion chambers, respectively, approximately at midlength thereof; said second passage means and said first throttled passage merging at opposite ends of said first expansion chamber; said fifth passage means and said second throttled passage merging at opposite ends of said second expansion chamber.

* * * * *